United States Patent
Chamberlain et al.

(10) Patent No.: US 9,424,170 B2
(45) Date of Patent: *Aug. 23, 2016

(54) SECOND FAILURE DATA CAPTURE IN CO-OPERATING MULTI-IMAGE SYSTEMS

(71) Applicant: INTERNATIONAL BUSINESS MACHINES CORPORATION, Armonk, NY (US)

(72) Inventors: Richard Nigel Chamberlain, Hursley (GB); Howard J. Hellyer, Hursley (GB); Matthew Francis Peters, Hursley (GB); Adam John Pilkington, Hursley (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/473,089

(22) Filed: Aug. 29, 2014

(65) Prior Publication Data

US 2014/0372808 A1    Dec. 18, 2014

Related U.S. Application Data

(63) Continuation of application No. 13/930,875, filed on Jun. 28, 2013.

(30) Foreign Application Priority Data

Aug. 8, 2012   (GB) .................................. 1214159.4

(51) Int. Cl.
*G06F 11/00* (2006.01)
*G06F 11/36* (2006.01)
*G06F 11/07* (2006.01)

(52) U.S. Cl.
CPC ....... *G06F 11/3688* (2013.01); *G06F 11/0715* (2013.01); *G06F 11/0778* (2013.01); *G06F 11/3636* (2013.01)

(58) Field of Classification Search
CPC ............. G06F 11/079; G06F 11/0709; G06F 11/3636; G06F 11/0724; G06F 11/0766; G06F 11/0787; G06F 11/0778; G06F 11/3466; G06F 11/3476; G06F 11/366; G06F 11/3065; G06F 11/3055; G06F 11/348; G06F 3/061; G06F 3/0653; G06F 11/3452; G06F 2201/835; G06F 2201/87; G06F 2201/875; G06F 2201/88
USPC .................................................. 714/38.11, 45
See application file for complete search history.

(56) References Cited

U.S. PATENT DOCUMENTS 5,664,155 A * 9/1997 Elko et al. ..................... 711/170
6,651,183 B1 * 11/2003 Gensler et al. ................. 714/4.3
(Continued)

FOREIGN PATENT DOCUMENTS

CN           1077037 A     10/1993
CN         101226495 A      7/2008

OTHER PUBLICATIONS

Chinese Application No. 201310343980.0, Office Action, Dec. 21, 2015, 7 pages.

*Primary Examiner* — Elmira Mehrmanesh
(74) *Attorney, Agent, or Firm* — Eustace P. Isidore; Yudell Isidore PLLC

(57) ABSTRACT

A method captures diagnostic trace information in a computer system having a plurality of software images. Information is received that is associated with a first failure in a first one of the plurality of software images. The received information is distributed to others of the plurality of software images. Further information is captured that is associated with a second failure in another one of the plurality of software images. The information associated with a first failure in a first one of said plurality of software images is combined with the information associated with a second failure in another of said plurality of software images, and the combined information is analyzed in order to determine a cause of the first failure.

19 Claims, 4 Drawing Sheets

(56) References Cited

U.S. PATENT DOCUMENTS

| | | | |
|---|---|---|---|
| 6,813,731 B2* | 11/2004 | Zahavi et al. | 714/45 |
| 7,080,287 B2* | 7/2006 | Salem | 714/38.11 |
| 7,120,685 B2* | 10/2006 | Ullmann | G06F 11/0709 709/224 |
| 7,454,665 B2* | 11/2008 | Menadue | 714/45 |
| 7,519,510 B2* | 4/2009 | Koehler et al. | 702/186 |
| 7,840,856 B2* | 11/2010 | Apte et al. | 714/48 |
| 8,381,014 B2* | 2/2013 | Abdul et al. | 714/4.1 |
| 2002/0073063 A1* | 6/2002 | Faraj | 707/1 |
| 2003/0120968 A1* | 6/2003 | Andress | G06F 11/0793 714/25 |
| 2004/0268314 A1* | 12/2004 | Kollman et al. | 717/128 |
| 2006/0143534 A1* | 6/2006 | Dall | 714/38 |
| 2006/0195731 A1* | 8/2006 | Patterson et al. | 714/723 |
| 2007/0016831 A1* | 1/2007 | Gehman et al. | 714/43 |
| 2008/0222456 A1* | 9/2008 | Jones | 714/45 |
| 2008/0276222 A1* | 11/2008 | Yamagami | 717/124 |
| 2009/0193298 A1* | 7/2009 | Mukherjee | G06F 11/0766 714/38.1 |
| 2012/0246517 A1* | 9/2012 | Bender et al. | 714/45 |
| 2014/0058538 A1* | 2/2014 | Yaoita et al. | 700/28 |

* cited by examiner

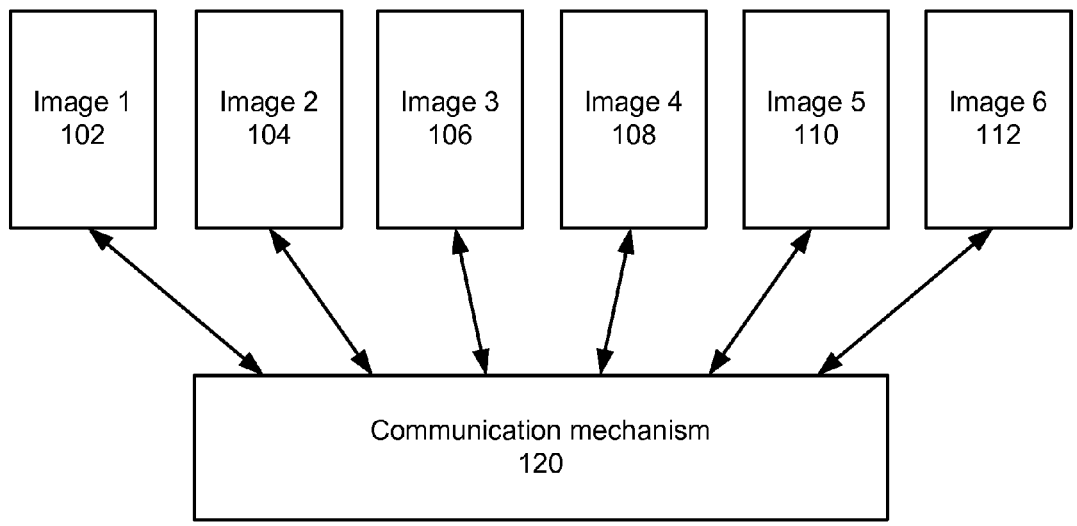
FIG. 1
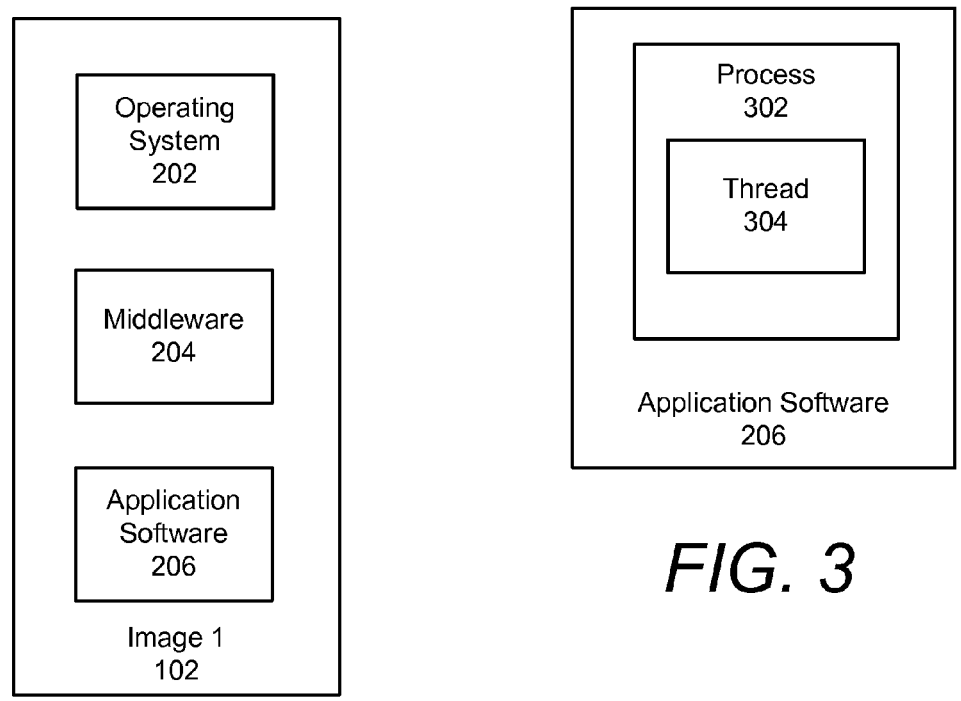
FIG. 2
FIG. 3

SECOND FAILURE DATA CAPTURE IN CO-OPERATING MULTI-IMAGE SYSTEMS

PRIORITY CLAIM

The present application is a continuation of U.S. patent application Ser. No. 13/930,875, titled "Second Failure Data Capture in Co-Operating Multi-Image Systems," filed on Jun. 28, 2103, which also claims benefit of priority under 35 USC §120 and §365 to the previously filed Great Britain Patent Application No. 1214159.4 titled, "Second Failure Data Capture un Co-Operating Multi-Image Systems" with a priority date of Aug. 8, 2012. The content of each application is incorporated by reference herein.

BACKGROUND

1. Technical Field

The present disclosure relates to the automated capture of diagnostic data in computer systems, and more particularly to the automated capture of diagnostic data in co-operating multi-image computer systems.

2. Description of the Related Art

Automatic capture of diagnostic data is well known in computer systems. It is often used in complex and/or long running applications to allow rapid resolution of problems without the need to reproduce failures in live or backup systems. A standard practice is to provide First Failure Data Capture (FFDC) in the form of dumps, logs and trace files, the data capture being triggered when a problem is detected.

A problem with this practice is that there is a compromise between the need to obtain sufficient diagnostic information for the problem to be resolved and the cost of producing that diagnostic information. The cost of producing the diagnostic information can include (a) the performance overhead to the application of continuously logging and tracing, (b) the time taken to produce dumps on a failure (which may delay restart of the application), and (c) the amount of disk space required to store the diagnostic information output.

Okano (PCT Pub. No. WO2012/026035) discloses a fault processing system that can reproduce a fault that occurs in the information processing device. There is a need in the art for a method and/or system that improves the quality and quantity of diagnostics information produced for failures in multi-image systems.

BRIEF SUMMARY

Embodiments of the present disclosure provide a method of capturing diagnostic trace information. The method is used in a computer system having a plurality of software images. The method comprises: receiving information associated with a first failure in a first one of said plurality of software images; distributing said information to others of said plurality of software images; capturing information associated with a second failure in another of said plurality of software images. This method has the advantage that the cost of capturing trace diagnostic information is minimized until a first failure occurs, after which, the value of captured trace diagnostic information is maximized and the cost of capturing trace diagnostic information is minimized by only capturing detailed trace diagnostic information that relates to the first failure.

In an embodiment, the step of distributing the information can be carried out by either a load balancer, a hypervisor, an operating system, monitoring software or a peer-to-peer communication mechanism.

In one embodiment, the step of distributing the information to the plurality of software images comprises distributing the first portion of the information to first ones of the plurality of software images and a second portion of the information to second ones of the plurality of software images. This has the advantage of distributing the load of collecting diagnostic trace information across the software images, but still enabling collection of comprehensive trace diagnostic information. The step of capturing information expires after a predetermined time period. In an alternative embodiment, the step of capturing information expires after a second failure. These embodiments limit the additional costs of capturing the diagnostic trace information by limiting the time period during which additional diagnostic trace information is captured.

In another embodiment, each of the software images further comprises processes or threads; and the information received is associated with a first failure in a first one of the processes or threads; the information distributed is distributed to others of the processes or threads; the information captured is associated with a second failure in another of the processes or threads. The diagnostic trace information received identifies a factor that is external to the software images as a cause of said first failure. This has the advantage that a failure caused by an external factor, such as a network failure, can cause additional trace diagnostic information related to the external factor to be collected in each of the software images.

In another embodiment, the method further comprises checking, after said receiving, whether one or more of other ones of the plurality of software images is executing the same software as the first one of the plurality of software images. The method further comprises: combining said information associated with a first failure in a first one of the plurality of software images and the information associated with a second failure in another of the plurality of software images; and analyzing the combined information in order to determine a cause of the first failure. This combining and analyzing of the trace diagnostic information allows determination of the cause of a failure without the need for reproducing the failure in live or in backup systems. The step of capturing information continues until the step of analyzing the combined information in order to determine a cause of the first failure is completed. This capturing allows information from any further failures to be captured whilst trace diagnostic information from previous failures is combined and analyzed, but allows the capture to stop when the analysis is complete.

Embodiments of the present disclosure also provide a computer system and a computer program product comprising: a computer readable storage device readable by a processing circuit and storing instructions for execution by the processing circuit for performing the method steps of the disclosure. The computer program is stored on a computer readable storage device and loadable into the internal memory of a digital computer, comprising software code portions, when said program is run on a computer, for performing the above method processes.

BRIEF DESCRIPTION OF THE DRAWINGS

The novel features believed characteristic of the disclosure are set forth in the claims. The disclosure itself, however, as well as a preferred mode of use, further purposes and advantages thereof, will best be understood by reference to the following detailed description of an illustrative embodiment when read in conjunction with the accompanying drawings, where:

FIG. 1 is a block diagram of a plurality of software images having a communication mechanism, in which the present disclosure may be used;

FIG. 2 is a block diagram of one of the software images of FIG. 1, according to one embodiment;

FIG. 3 is a block diagram of the application software of FIG. 2, according to one embodiment;

DETAILED DESCRIPTION OF ILLUSTRATIVE EMBODIMENTS

Figure 4:
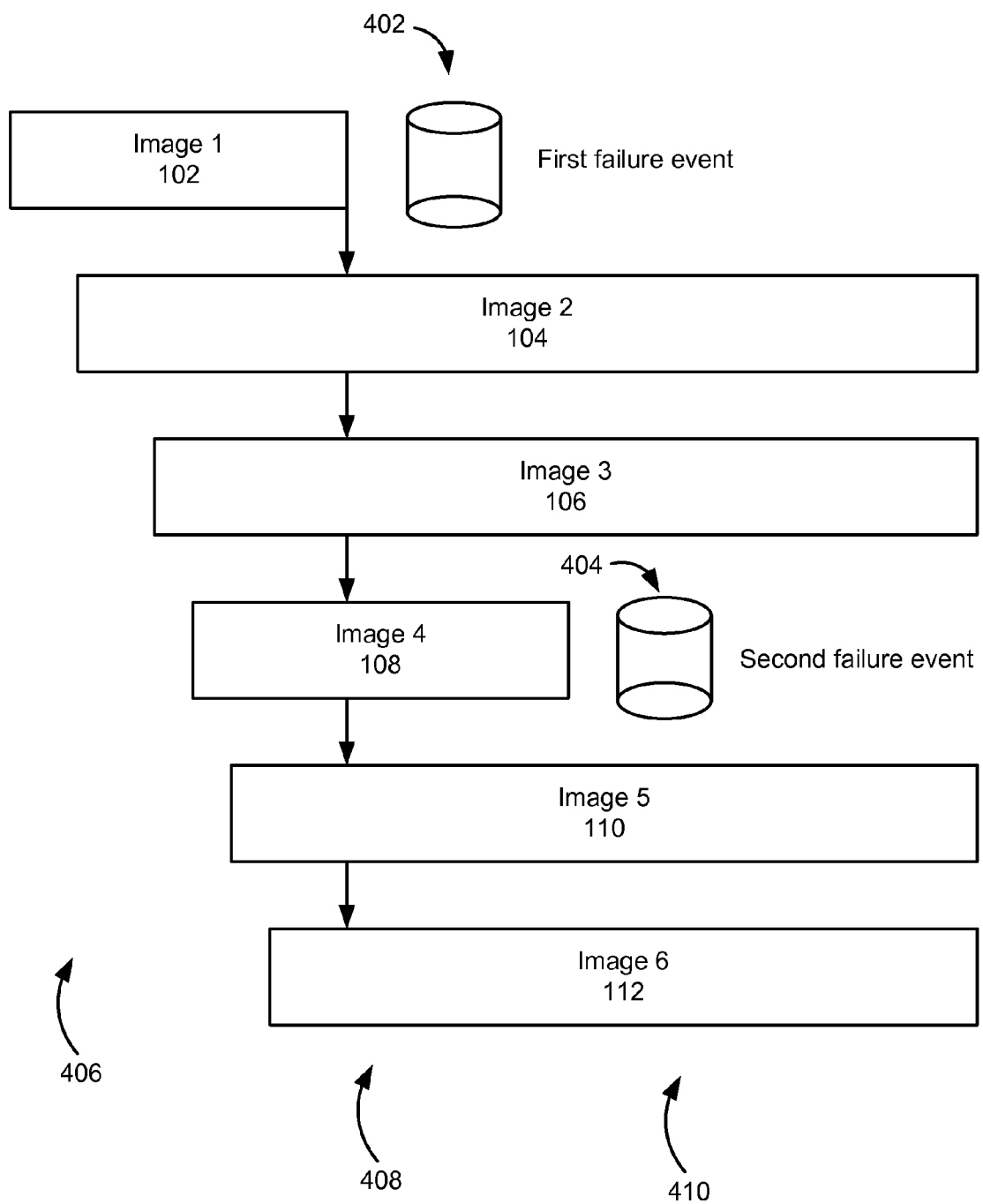
FIG. 4 shows a temporal relationship between the plurality of images of FIG. 1, a first failure event and a second failure event, according to one embodiment.

With reference now to FIG. 1, application servers having software images 102, 104, 106, 108, 110, and 112 each operate individually processing data and communicate with each other using a communication mechanism 120. Communication mechanism 120 may be a load balancer, a hypervisor, an operating system or monitoring software. In another embodiment communication mechanism 120 may be simply a peer-to-peer communication mechanism.

Referring now to FIG. 2, there is presented one of the software images 102 of FIG. 1. Typically the software image 102 comprises an operating system 202, middleware 204 and application software 206. Any of these elements may or may not be present in the software image and other components not mentioned above may be present in the software image. In one embodiment, each of the software images is identical to others of the software images. In other embodiments, each of the software images has components in common with others of the software images.

Referring now to FIG. 3, there is shown additional aspects of the application software 206 of FIG. 2. Typically the application software 206 will be executed as a number of processes 302, each of these processes 302 having a number of threads 304. Although FIG. 3 shows only one process 302 having one thread 304, any number of processes may be executing, each process having any number of threads. Each one of the executing processes 302 may have a different number of threads 304.

Referring now to FIG. 4, there is illustrated a timeline of the system of FIG. 1 including execution cycle of images 1-6 102-112. Image 2 104, image 3 106, image 5 110 and image 6 112 each start executing and each continue to execute without failing. Image 1 102 starts executing at time 406, and continues execution until time 408 when a failure occurs. This failure causes a failure event. The failure event results in trace diagnostic information being logged to a log file 402. The trace diagnostic information is typically First Failure Data Capture (FFDC) data that is set to be always on. That is, the trace diagnostic information is a general selection of trace diagnostic information that is optimized to enable the failing software component and any external cause for a failure, such as a process signal or an I/O error, to be identified. Detailed trace diagnostic information is not set to be always captured because of the cost of producing that diagnostic information, such as the performance overhead, the time taken to produce dumps on a failure and the amount of disk space required to store the diagnostic information output.

FIG. 4 also shows a second failure occurring at time 410 in image 4 108. This failure causes a failure event, which generates trace diagnostic information that is logged to a next log file 404. The next log file 404 contains more detailed trace diagnostic information for the software component that failed in image 1 102 at time 408 or for the cause of failure in image 1 102 at time 408. If the cause of the failure in software image 4 108 is the same or similar to that which caused the earlier failure in image 1, then the more detailed trace diagnostic information captured is likely to be of considerable assistance in identifying the cause of the failures and in identifying action that should be taken to prevent further failures from occurring.

Figure 5:
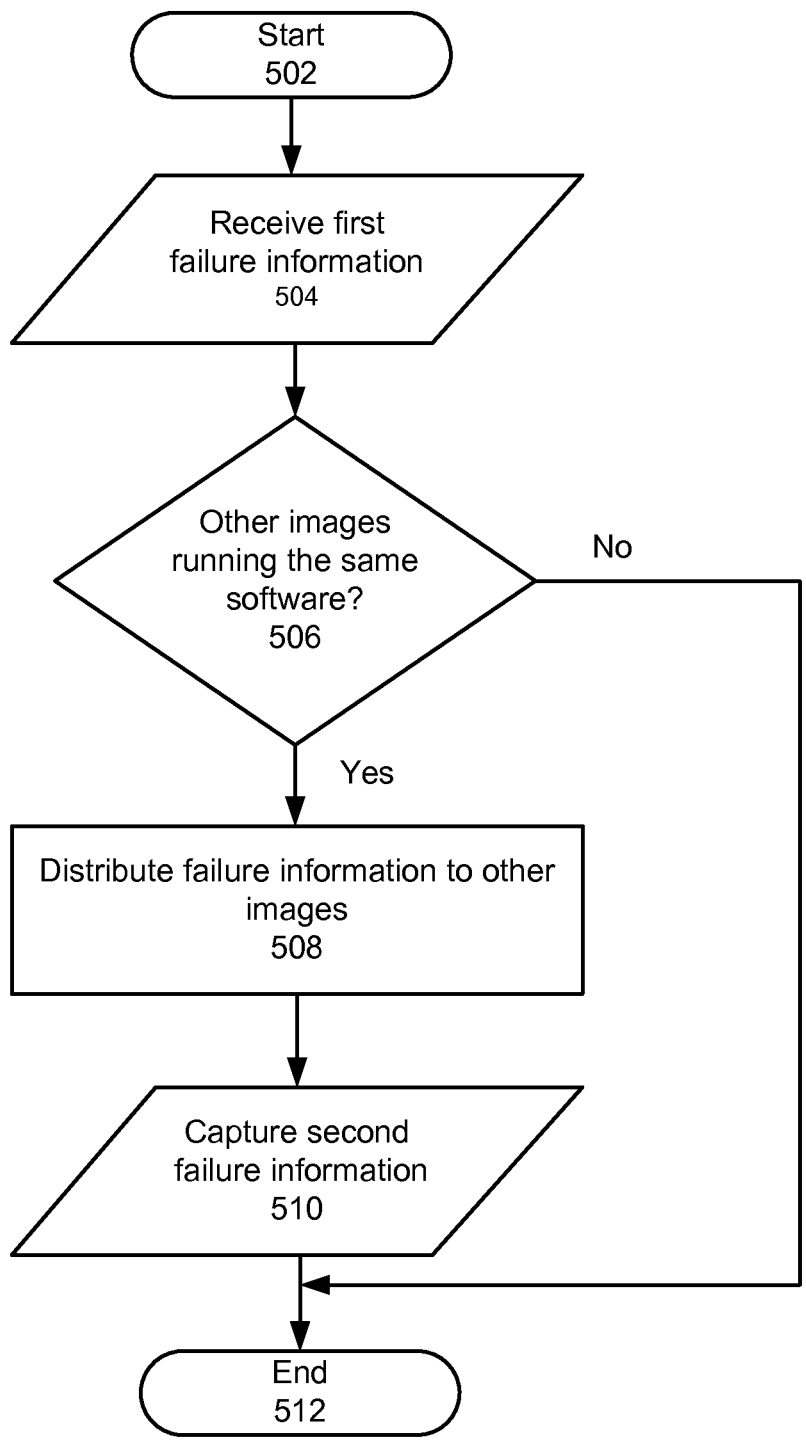
FIG. 5 is a flow diagram of the capture of diagnostic trace information according to an embodiment of the present disclosure.

Referring now to FIG. 5, the method of an embodiment of the present disclosure starts at step 502. The first failure data is received by the communications mechanism at step 504. A check is made at step 506 to see if there are any other images which are running the same software. As explained above, in other embodiments, each of the software images has components in common with others of the software images. If there are no other images which are running the same software and, optionally, if there are no other images having components in common with the failed image, then the method ends at step 512.

If there are other images running the same software, or optionally, having components in common, then at step 508, the failure event also results in information associated with the failure being passed from image 1 102 to other images 2 to 6 104-112 through the communication mechanism 120. These images 2 to 6 104-112 are running at least some software components that are the same as those running in image 1 102 which failed at time 408. Images 2 to 6 104-112 are then able to adjust their diagnostic configuration in anticipation of the same failure occurring in these images as in image 1 102. For example, if a particular software component in image 1 102 has been identified as causing the failure, then more detailed logging of the operation of that particular software component may be undertaken in images 2 to 6 104-112. This may include additional tracing being turned on in the software component. As another example, if the cause of the failure in image 1 102 was a shortage of memory, images 2 to 6 104-112 can start to log more detailed information about memory usage in their images. The failure event results in trace diagnostic information being logged to a log file 404, at step 510 in FIG. 5. The method ends at step 512.

In another embodiment, in what might be called a "speculative" or "terraced" embodiment, the increased level of capture of trace diagnostic information is load-balanced across the images 102-112. Each of the images is configured to capture more comprehensive trace diagnostic information for a specific part or for specific parts of the software stack. Between the images 102-112, trace diagnostic information is captured for all the required parts of the software stack. The images may also be configured to capture any subset of trace diagnostic information which may be desirable and for which coverage may be divided among some or all of the images.

In another embodiment, the method described above may be applied not across images 102-112, but across processes 302 or across threads 304. A first process to fail captures trace diagnostic information which is used to reconfigure what trace diagnostic information is captured by other processes if and when they fail. Similarly, a first thread to fail may capture trace diagnostic information, which information is then used to reconfigure what trace diagnostic information that is captured by other threads if and when they fail. This method across processes and across threads may be combined with the method used across images or may be used separately.

In another embodiment, the reconfigured capture of trace diagnostic information may be applied across other images, processes or threads for a predetermined time period after the first failure event before the level of capture of trace diagnostic information returns to the level it was before the first failure or is set to another predetermined level.

In another embodiment, the level of capture of trace diagnostic information on all the images is returned to the level it was before the first failure event after a second or subsequent failure event has occurred and/or sufficient trace diagnostic information has been captured.

In another embodiment, the method described in FIG. 5 can be applied to non-identical software stacks or workload. For example, for a failure caused by a common external factor such as a network failure, one or more images, processes or threads can be configured to capture additional trace diagnostic information, with different configurations being used as appropriate for an anticipated network failure in each image, process or thread.

Figure 6:
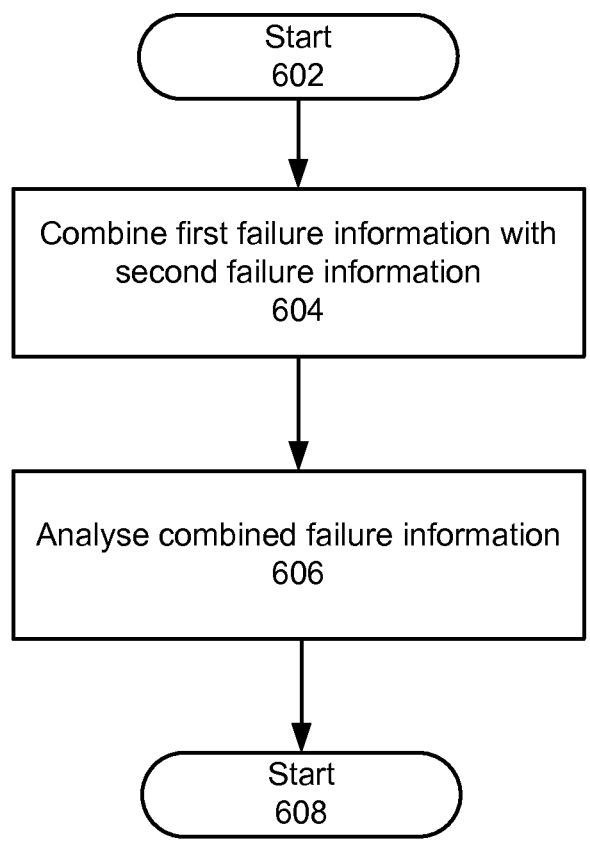
FIG. 6 is a flow diagram of analysis of diagnostic trace information captured by the embodiment of FIG. 5.

Referring now to FIG. 6, analysis of the failure using the trace diagnostic information starts at step 602. The first failure data is combined with the second failure data at step 604. The combined information is then analyzed at step 606. The analysis ends at step 608. In another embodiment, the first failure data is analyzed first and then the second failure data is analyzed taking into account the findings of the first failure data. The analysis may be carried out in the first image 102 or by others of the images 104-112 on receipt of the failure information from the first image 102.

In another embodiment, images 102-112 that start or restart after the failure can also be configured to capture an increased level of trace diagnostic information.

As will be appreciated by one skilled in the art, aspects of the present disclosure may be embodied as a system, method, computer program product or computer program. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java®, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). Java and all Java-based trademarks and logos are trademarks or registered trademarks of Oracle and/or its affiliates.

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

For the avoidance of doubt, the term "comprising", as used herein throughout the description and claims is not to be construed as meaning "consisting only of".

Note while the present invention has been particularly shown and described with reference to specific embodiments, it will be understood by those skilled in the art that various changes in form and detail may be made therein without departing from the spirit and scope of the invention. For example, while the present description has been directed to a preferred embodiment in which custom software applications are developed, the invention disclosed herein is equally applicable to the development and modification of application software. Furthermore, as used in the specification and the appended claims, the term "computer" or "system" or "computer system" or "computing device" includes any data processing system including, but not limited to, personal computers, servers, workstations, network computers, main frame computers, routers, switches, Personal Digital Assistants (PDA's), telephones, and any other system capable of processing, transmitting, receiving, capturing and/or storing data.

The invention claimed is:

1. A method for capturing diagnostic trace information in a computer system having a plurality of software images, the method comprising:
   receiving information associated with a first failure in a first one of the plurality of software images;
   distributing the information to others of the plurality of software images;
   capturing information associated with a second failure in another one of the plurality of software images;
   combining the information associated with the first failure in the first one of the plurality of software images and the information associated with the second failure in another one of the plurality of software images;
   analyzing the combined information in order to determine a cause of the first failure;
   based on the cause of the first failure, identifying one or more actions to prevent further failures; and
   in response to starting at least one of the plurality of software images after a failure, increasing a level of information that is captured for the at least one of the plurality of software images responsive to a subsequent failure.

2. The method of claim 1, wherein the distributing the information is carried out by one of a load balancer, a hypervisor, an operating system, monitoring software, and a peer-to-peer communication mechanism.

3. The method of claim 1, wherein distributing the information to others of the plurality of software images further comprises distributing a first portion of the information to first ones of the plurality of software images and distributing a second portion of the information to second ones of the plurality of software images.

4. The method of claim 1, wherein a period for completing the capturing of information expires after a predetermined time period.

5. The method of claim 1, wherein a period for completing the capturing of information expires following a detection of a second failure.

6. The method of claim 1, wherein:
   each of the software images further comprises one or more processes or threads;
   the information received is associated with a first failure in a first one of the processes or threads;
   the information distributed is distributed to others of the processes or threads; and
   the information captured is associated with a second failure in another one of the processes or threads.

7. The method of claim 1, wherein the information received identifies a factor external to the software images as the cause of the first failure.

8. The method of claim 1, further comprising checking, prior to the receiving step, whether one or more of other ones of the plurality of software images is executing the same software as the first one of the plurality of software images.

9. The method of claim 1, wherein a period in which the capturing of information is performed continues until completion of the analyzing of the combined information in order to determine the cause of the first failure.

10. The method of claim 1, wherein the information associated with the first failure is used to configure others of the plurality of software images to capture an increased level of trace diagnostic information responsive to a failure.

11. The method of claim 10, wherein the increased level of trace diagnostic information is captured by others of the plurality of software images responsive to a failure within a predetermined time period, the method further comprising:
   in response to the predetermined time period expiring, reverting a level of trace diagnostic information that is captured by others of the plurality of software images to a second predetermined level.

12. The method of claim 10, wherein the increased level of trace diagnostic information is captured by others of the plurality of software images responsive to a failure within a predetermined time period, the method further comprising:
   in response to the predetermined time period expiring, reverting a level of trace diagnostic information that is captured by others of the plurality of software images to a level prior to the first failure.

13. The method of claim 10, further comprising:
   in response to a sufficient amount of trace diagnostic information being captured, reverting the level of trace diagnostic information that is captured by others of the plurality of software images responsive to a failure to a level that was established prior to the first failure.

14. The method of claim 10, further comprising:
load balancing the capturing of the trace diagnostic information across the plurality of software images, wherein each one of the plurality of software images captures trace diagnostic information for a particular one or more parts of a software stack.

15. The method of claim 10, further comprising:
load balancing the capturing of the trace diagnostic information across the plurality of software images, wherein each one of the plurality of software images captures a particular one or more parts of a particular subset of the detailed trace diagnostic information.

16. The method of claim 1, wherein each of the plurality of software images has at least one of a non-identical software stack and a non-identical workload.

17. The method of claim 1, wherein the cause of the failure is at least one of: a particular software component, a particular process signal, an input/output (I/O) error, and a memory shortage.

18. A method for capturing diagnostic trace information in a computer system having a plurality of software images, the method comprising:
receiving information associated with a first failure in a first one of the plurality of software images;
distributing the information to others of the plurality of software images;
capturing information associated with a second failure in another one of the plurality of software images;
combining the information associated with the first failure in the first one of the plurality of software images and the information associated with the second failure in another one of the plurality of software images;
analyzing the combined information in order to determine a cause of the first failure;
based on the cause of the first failure, identifying one or more actions to prevent further failures;
determining whether a same software component has failed in the first one and the another one of the plurality of software images; and
in response to determining the same software component has failed in the first one and the another one of the plurality of software images, capturing a detailed trace diagnostic information for the software component in the another one of the plurality of software images.

19. A method for capturing diagnostic trace information in a computer system having a plurality of software images, the method comprising:
receiving information associated with a first failure in a first one of the plurality of software images;
distributing the information to others of the plurality of software images;
capturing information associated with a second failure in another one of the plurality of software images;
combining the information associated with the first failure in the first one of the plurality of software images and the information associated with the second failure in another one of the plurality of software images;
analyzing the combined information in order to determine a cause of the first failure;
based on the cause of the first failure, identifying one or more actions to prevent further failures;
in response to analyzing the first failure in the first one of the plurality of software images, analyzing the information associated with the second failure based on findings associated with the analysis of the first failure in order to determine a cause of the second failure; and
based on the cause of the second failure, identifying at least one action to prevent further failures.

* * * * *